(12) United States Patent
Lee et al.

(10) Patent No.: US 8,092,919 B2
(45) Date of Patent: Jan. 10, 2012

(54) TOUGHENED POLYACETAL COMPOSITIONS AND BLENDS HAVING LOW SURFACE GLOSS

(75) Inventors: Win-Chung Lee, Hockessin, DE (US); Francis J. Eichstadt, Hamilton, OH (US); Jerome P. Moraczewski, Cochranville, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 284 days.

(21) Appl. No.: 12/154,567

(22) Filed: May 23, 2008

(65) Prior Publication Data

US 2008/0286577 A1 Nov. 20, 2008

Related U.S. Application Data

(63) Continuation-in-part of application No. 11/159,087, filed on Jun. 22, 2005, now abandoned.

(60) Provisional application No. 60/582,571, filed on Jun. 24, 2004.

(51) Int. Cl.
| | |
|---|---|
| *B32B 25/04* | (2006.01) |
| *B32B 25/08* | (2006.01) |
| *B32B 25/12* | (2006.01) |
| *B32B 27/08* | (2006.01) |
| *B32B 27/42* | (2006.01) |

(52) U.S. Cl. .................. 428/492; 428/494; 428/525
(58) Field of Classification Search .................. 428/492, 428/494, 525
See application file for complete search history.

(56) References Cited

U.S. PATENT DOCUMENTS

| | | | |
|---|---|---|---|
| 7,294,329 B1 * | 11/2007 | Ding ........................ | 424/1.65 |
| 2005/0032950 A1 * | 2/2005 | Lee et al. ................. | 524/261 |

* cited by examiner

*Primary Examiner* — Nathan M Nutter
(74) *Attorney, Agent, or Firm* — Loretta Smith; Otha Weaver

(57) ABSTRACT

Polyacetal compositions and blends toughened with polyvinylbutyral having enhanced adhesive surface properties, including enhanced surface adhesion and low surface gloss, are disclosed. Also disclosed are articles of manufacture comprising the polyacetal compositions described herein.

7 Claims, No Drawings

TOUGHENED POLYACETAL COMPOSITIONS AND BLENDS HAVING LOW SURFACE GLOSS

This application is a Continuation-In-Part of U.S. application Ser. No. 11/159,087, filed Jun. 22, 2005, which claims the benefit of U.S. Provisional Application No. 60/582,571, filed Jun. 24, 2004.

FIELD OF THE INVENTION

The present invention relates to blends of polyoxymethylene (polyacetal) with polyvinylbutyral (PVB). More particularly, the present invention relates to such blends, processes for the manufacture of such materials, and molded articles prepared therefrom.

BACKGROUND OF THE INVENTION

Polyoxymethylene is a preferred material for a wide variety of end-uses. Articles made from polyoxymethylene compositions typically possess extremely desirable physical properties such as high stiffness, high strength and solvent resistance. However, the surfaces of articles made from polyoxymethylene compositions are highly crystalline and exhibit poor adhesion to other materials. It can be very difficult to paint, glue, or print on such surfaces. It is also difficult to overmold such articles with thermoplastic polymers or adhere some other type of layer to the surface. Furthermore, such articles have high surface gloss and light reflected from the surface tends to cause eye irritation. Low surface gloss on fabricated articles on the other hand tends to impart a more aesthetically pleasing high-grade appearance to the articles.

Polyoxymethylene compositions include compositions based on homopolymers of formaldehyde or of cyclic oligomers of formaldehyde. For example trioxane, the terminal groups of which are end-capped by esterification or etherification. The polyoxymethylene compositions also include compositions based on copolymers of formaldehyde or of cyclic oligomers of formaldehyde, with oxyalkylene groups having at least two adjacent carbon atoms in the main chain, the terminal groups of which copolymers can be hydroxyl terminated or can be end-capped by esterification or etherification. The proportion of the comonomers can be up to 20 weight percent. Compositions based on polyoxymethylene of relatively high molecular weight, for example 20,000 to 100,000, are useful in preparing semi-finished and finished articles by any of the techniques commonly used with thermoplastic materials, such as, for example, compression molding, injection molding, extrusion, blow molding, stamping and thermoforming. It can be desirable to enhance the surface adhesion and reduce gloss in polyoxymethylenes.

Plasticized PVB is an adhesive that can be difficult to handle as a feed to a compounding extruder due to its inherent stickiness. Similarly PVB sheet is a material that can be difficult to work with because of the tendency to adhere to itself. Recently it has been found that PVB can be blended with other materials to obtain composites that have a reduced is tendency to self-adhere. See for example, WO 02/12356 directed to a process for preparing pellets from PVB scrap material. Heretofore it would not have been possible to obtain suitable blends of PVB and polyoxymethylene polymers.

It has been found that polyacetal compositions that include free-flowing PVB do not have the same degree of toughness as the polyacetal prior to inclusion of the PVB. Use of conventional tougheners, while effective in toughening many thermoplastic polymer compositions, can increase the gloss of an article comprising said tougheners. It is an objective of the present invention to produce low-gloss products, and therefore conventional tougheners that increase gloss are not suitable for use herein. For example, polyurethanes are incorporated in U.S. Pat. Nos. 4,640,949; 4,804,716; 4,845,161; 5,286,807 as tougheners, but also increase gloss. U.S. Pat. Nos. 5,258,431 and 5,484,845 describe polyacetal compositions comprising core shell resin.

It is an object of the present invention to provide PVB-enhanced polyoxymethylene (polyacetal) compositions that have enhanced surface adhesion, that are tough, and that have low surface gloss.

SUMMARY OF THE INVENTION

In one aspect, the present invention is a thermoplastic polyacetal composition comprising: (a) from about 1 to about 30 weight percent of a free-flowing polyvinyl butyral (PVB) composite composition comprising from about 20 weight percent to about 95 weight percent PVB; (b) 99 to 24 weight percent polyacetal that is melt processible in a range below about 250° C. and having a number average molecular weight of at least 10,000; (c) at least about 1 weight percent toughening agent, wherein the toughening agent is an ethylene-vinyl acetate copolymer, a polyurethane polymer or a combination of the two; (d) an optional coupling agent in an amount of up to 1.0 weight percent; and (e) optionally, a filler in an amount of up to about 45 weight percent.

In another aspect, the present invention is an article obtained from a polyacetal composition wherein the polyacetal composition comprises: (a) from about 1 to about 30 weight percent of a free-flowing polyvinyl butyral (PVB) composite composition comprising from about 20 weight percent to about 95 weight percent PVB; (b) 99 to 24 weight percent polyacetal that is melt processible in a range below about 250° C. and having a number average molecular weight of at least 10,000; (c) at least about 1 weight percent toughening agent, wherein the toughening agent is an ethylene-vinyl acetate copolymer, a polyurethane polymer or a combination of the two; (d) an optional coupling agent in an amount of up to 1.0 weight percent; and (e) optionally, a filler in an amount of up to about 45 weight percent, wherein the article has a toughness as measured according to ASTM D256 or ISO 180 of greater than about 1 ft-lb/in² (4.78 kJ/m²) and surface gloss of less than about 68% when measured from an angle of 60 degrees according to either ASTM D2457 or ASTM D523.

In still another aspect, the present invention is a process for preparing a polyacetal composition having a Notched Izod of greater than about 1.0 ft-lbs/in² (4.78 kJ/m²) as determined according to ASTM D256 and a surface gloss of less than about 68% as measured according to either ASTM D523 or ASTM D2457, the process comprising the step of: blending a polyacetal composition with a free-flowing polyvinyl butyral (PVB) composition and a toughener, wherein the PVB composition is included in an amount of from about 1 to about 30 wt % of the total polyacetal composition and the toughener is either an ethylene vinyl acetate copolymer or a polyurethane polymer.

DETAILED DESCRIPTION OF THE INVENTION

In the present description, the term 'polyacetal' has the same meaning as 'polyoxymethylene'. In one embodiment, the present invention is a polyacetal composition having enhanced surface adhesion properties. A composition of the present invention comprises a free-flowing PVB composition, as described in WO0212356, as a toughener and gloss reducing composition. The teachings of WO0212356 are hereby incorporated by reference. The free-flowing PVB composition comprises from about 20 to about 95 wt %, preferably from about 40 wt % to about 95 wt %, more preferably from about 60 wt % to about 95 wt %, and most preferably from about 75 wt % to about 95 wt % PVB. The PVB composition comprises at least one component in addition to the PVB. Such other component can be monomeric or polymeric materials, or mixtures thereof. The other component can be selected from polymers and/or monomers that have reactive functionality, or non-reactive polymer and/or monomers such as, for example, polyethylene, polypropylene, polyvinylchloride, nylon, other thermoplastic materials, or mixtures thereof. Preferably the other component is a polymer composition that includes reactive functionality such as carboxylic acid functionality or anhydride functionality. For example, Fusabond® polymers are polyolefins having anhydride functionality and are available commercially from E.I. DuPont de Nemours and Company. In addition to (a) the other components (b) and (c) are present in amounts that are complimentary to the amount of PVB, that is the amount required to account for 100%, by weight, of the composition. When optional components (d) and/or (e) are also present, (d) and (e) are present in amounts that are complimentary to the total amount of PVB with (b) and (c, required to account for 100%, by weight, of the composition.

A composition of the present invention comprises from about 1 wt % to about 30 wt %, preferably from about 5 wt % to about 28 wt %, more preferably from about 6 wt % to about 25 wt %, and most preferably from about 7 wt % to about 25 wt % of the free-flowing PVB composition.

The PVB composition of WO 0212356, when incorporated with a thermoplastic polymer composition, can affect the surface properties of an article produced therefrom and lower the gloss on the surface of the article. A plastic surface having low gloss can be a desirable property in articles used for certain applications.

In some instances the free-flowing PVB composition described in WO 0212356 can act as a toughener of a thermoplastic resin composition. In the practice of the present invention however, when added at levels sufficient to reduce surface gloss, the PVB composition described in WO 0212356 surprisingly can have a detrimental effect on the toughness of the compositions described herein, as measured by the Notched Izod test. Therefore, because toughness is a desirable property in a composition of the present invention, it is desirable that an alternate toughener be added to the composition of the present invention to produce a polymeric composition having toughness of at least that of the polymeric composition without added PVB. The compositions of this invention are prepared by blending the PVB composition, and a toughener with a polyacetal, and optionally including a coupling agent and/or other ingredients to produce a toughened polyacetal blend having enhanced surface properties. The toughening agent, or toughener can be an ethylene vinyl acetate copolymer composition or a polyurethane polymer. In one preferred embodiment, a composition of the present invention comprises a polyurethane polymer as a toughener. In another preferred embodiment, the present invention comprises as toughener an ethylene vinyl acetate (EVA) copolymer. The EVA copolymer can be included as a separate component, or in combination with polyvinylbutyrals as a free-flowing PVB composition.

PVB compositions of the present invention help to reduce surface gloss when used as described herein. However, in another embodiment the present invention can comprise an inorganic carbonate salt as an additional gloss reducer. The carbonate salt can be added either in addition to, or as an alternative to the PVB component of the present invention. The carbonate salt can have as a counterion any metal cation such as one selected from the alkali metal cations, alkaline earth metal ions, or transition metal ions for example. An effective amount of carbonate salt is preferred. As the term is used herein, an "effective amount" is any amount that creates the desired effect. For example, an effective amount of gloss-reducer can be the minimum amount of gloss-reducer that is necessary to reduce the surface gloss of a plastic article to an acceptable level.

Cost of the toughener can be a determinative factor in the amount that is included in a composition of the present invention. The toughener can be included in any effective amount to produce a polymeric composition comprising the PVB or gloss-reducing component described herein, wherein the toughened polymeric composition has Izod and elongation at break at least as high as the polymer in the absence of the PVB component. The toughener can be included in any amount of at least about 1 wt %, or at least about 3 wt %, or at least about 5 wt %, or at least about 7 wt %, or at least about 10 wt %. The amount of toughener used can depend on achieving a proper balance between toughness, gloss and/or other properties of the blend. In a preferred embodiment, the toughener is included in an amount of from about 1 to about 25 wt %, based on the total weight of the low-gloss toughened polymer composition. Preferably, the toughener is included in an amount of from about 1 wt % to about 20 wt %, more preferably in an amount of from about 2 wt % to about 18 wt %, and most preferably in an amount of from about 2 wt % to about 16 wt %.

In one preferred embodiment the toughener can comprise polyurethane. Polyurethane is known as a toughening component for polyacetal polymers, but yields articles with high surface gloss unless combined with PVB as described herein. The polyurethane toughener can be blended with another component that can provide a lower cost solution to the problem of making a tough, low-gloss polyacetal product.

Surprisingly, the toughening agent can be an ethylene/vinyl acetate (EVA) copolymer that is blended with PVB and the polyacetal. PVB can be combined according to the procedures described in WO0212356 for making other free-flowing PVB composite materials. The PVB/EVA blend can provide toughness and low gloss to polyacetals with or without added polyurethane. Toughened polyacetal blends of the present invention preferably have Notched Izod (Nizod) values, as measured according to ASTM D256 or ISO 180, of at least 1.0 ft-lbs/in$^2$ (4.78 kJ/m$^2$). Preferably the Nizod is at least about 1.5 ft-lbs/in$^2$, and more preferably at least about 2.0 ft-lbs/in$^2$.

Other important measurements include the percent elongation at yield (% EL-Y), percent elongation at break (% EL-B), the tensile strength (TS), and the flexural modulus (F.Mod).

The polyacetal component are melt-processible polymers that melt below 250 deg C., and are homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyacetal component of the present invention can be branched or linear and will generally have a number average molecular weight in the range of at least 10,000, preferably about 20,000 to about 90,000, and more preferably about 25,000 to about 70,000. The molecular weight can be measured by gel permeation chromatography in m-cresol at 160° C. using a DuPont PSM bimodal column kit with nominal pore size of 60 and 100 A. In general, high molecular weight polyacetal segregates from the second phase material to a greater degree to the non-polyacetal components, and thus addends may show greater adhesion. Although polyacetal having higher or lower molecular weight averages can be used, depending on the physical and processing properties desired, the polyacetal weight averages mentioned above are preferred to provide the optimum balance of surface adhesion with other physical properties such as high stiffness, high strength and solvent resistance.

As an alternative to characterizing the melt-processible polyacetal by its number average molecular weight, it can be characterized by its melt flow rate. Polyacetal in the blends of the present invention will have a melt flow rate (measured according to ASTM-D-1238, Procedure A, Condition G with a 1.0 mm (0.0413) diameter orifice of 0.1-40 grams/10 minutes). Preferably, the melt flow rate of the polyacetal used in the blends of the present invention will be from about 0.5-35 grams/10 minutes. The most preferred polyacetals have a melt flow rate of about 1-20 gram/10 minutes.

As indicated above, the melt-processible polyacetal used in the practice of the present invention can be either a homopolymer, a copolymer or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomers will be no more than 20 weight percent, preferably not more than 15 weight percent, and most preferably about 2 weight percent. The most preferred comonomer is ethylene oxide. Generally, polyacetal homopolymer is preferred over copolymer because of its greater stiffness and strength. Preferred polyacetal homopolymers include those whose terminal hydroxyl groups have been end-capped by a chemical reaction to form ester or ether groups, preferably acetate or methoxy groups, respectively.

The polyacetal may also contain those additives, ingredients, and modifiers that are known to be added to polyacetal compositions for improvement in molding, aging, heat resistance, and the like.

A coupling agent is optionally included in the composition of the present invention. The coupling agent enhances the adhesive surface properties of the toughened polyacetal compositions of the present invention. The coupling agent can be a silane compound. Preferably the coupling compound is selected from the group consisting of: gamma-aminopropyltrimethoxysilane; gamma-aminopropyltriethoxysilane; N-2-aminopropyltrialkoxysilane; or N-(2-aminoethyl)-3-aminopropylmethyldialkoxysilane. When present, the coupling compound is preferably included in an amount of at least about 0.01 wt %. More preferably, the coupling agent is present in an amount of from about 0.1 to about 3 wt %. More preferably, the coupling agent is present in an amount of from about 0.3 wt % to about 2.0 wt %, and most preferably in an amount of from about 0.5 wt % to about 1.5 wt %. The coupling agent can be present as a coating or as a dispersed component in the composition. The coupling agent can function to enhance the adhesion between the toughened polyacetal and a second polymer, such as a thermoplastic elastomer (TPE). TPE's can be desirable because of the soft feel of the polymer, and are also referred to herein as soft touch polymers.

Optional components such as fillers can be present. Fillers can be present in an amount of up to 45 wt %. Particularly preferred are fiber glass-filled polyacetal compositions and/or mineral-filled polyacetal compositions. Suitable mineral fillers are, for example, calcined clay, wollastonite, or talc. Polymeric materials that are non-reactive with the other components may be used as fillers, as well. Polymers useful as fillers in the practice of the present invention include, for example: polyurethane, polyamides, polyesters, and polyacrylates An antioxidant is not required; however, one is preferred. If included, the antioxidant can be present in an amount of at least about 0.1% by weight, and up to an amount where the effect of the antioxidant is optimal.

In another embodiment, the present invention is a process for preparing toughened polyacetal compositions of the present invention. The PVB composition of the present invention can be obtained using the process described in WO 0212356, for example, wherein PVB is combined with a second polymeric component to yield non-blocking pellets having a substantial amount of PVB. PVB is a commercially available product useful for imparting shatter-resistance to glass in myriad applications, among them windshields for automobiles and window glass in homes and buildings. The preparation of PVB is a well-known reaction between aldehyde and alcohol in an acid medium. Use of plasticizer can be conventional. Useful plasticizers are known and are commercially available compounds such as, for example, diesters of aliphatic diols with aliphatic carboxylic acids, e.g. tri-ethylene glycol di-2-ethylhexoate (3GO), or tetra-ethylene glycol di-n-heptanoate (4G7). Virgin plasticized PVB sheets (that is, PVB that is obtained first-hand from a manufacturer's roll) can be obtained commercially from DuPont under the brandname of BUTACITE®, for example. PVB can be obtained from other sources, as well, including excess PVB obtained from the edge trim from safety or architectural glass manufacturing operations, PVB recovered from scrap automotive or architectural glass, PVB not considered usable in other commercial applications, and other similar sources or mixtures of these sources. Any of these sources can be satisfactorily used without departing from the spirit and scope of this invention.

In a preferred embodiment, plasticized PVB and three other ingredients: (1) a reactive polymer such as a polymer having anhydride or carboxylic acid functionality; (2) a non-reactive polymer such as polyethylene, polypropylene, or ethylene/n-butyl acrylate/CO terpolymer; and (3) an antioxidant; are mixed in a batch process or a continuous process at an elevated temperature in the range of from about 100° C. to about 280° C., preferably from about 150° C. to about 220° C. to provide a homogeneous melt blend. This blend is dropped to a set of roll mills to mix further and press it into sheet form. A strip of the sheet is continuously fed to an extruder through a belt feeder. In the extruder, the mixture is melted again and pushed through a melt filter to remove any solid contamination. The clean melt is distributed to a die with multiple holes. An under water face cutter cuts those polymers from die face into pellets. The water quenches those pellets while cutting and carries them into a screen to separate them from the bulk water. Wet pellets are dried in a fluidized dryer before packout.

The pellets thus obtained can be mixed by melt-blending with suitable polyacetal compositions. For example, the toughened polyacetal blends suitable for use herein can be obtained by melt blending, or melt mixing in any suitable blending or mixing device, such as a Banbury blenders, Haake mixers, Farrell mixers, or extruders. Extruders can be either single screw or twin screw extruders with screws having various degrees of severity. Mixing or blending can be done at a temperature in the range of from about 100° C. to about 250° C., and preferably at a temperature in the range of from about 150° C. to about 230° C.

Toughened polyacetals of the present invention give compressive shear strength (CSS) values of greater than 200 psi, as determined by Compressive Shear tests. CSS is a measure of adhesion. Preferably the CSS is at least 300 psi, and more preferably at least 400 psi. Toughened polyacetals having further enhanced adhesive properties are obtained by further incorporating a coupling or crosslinking agent with the toughened polyacetal. For example, a coupling agent such as Silquest A-1100® (gamma-aminopropyltriethoxysilane), which is commercially available from Crompton Corp., can be incorporated by either inclusion into the bulk of the toughened polyacetal composition, or by coating the surface of the toughened polyacetal composition. The coupling compound can be incorporated in either manner as an aqueous solution. The pH of the solution can be lowered using an acid such as acetic acid or citric acid, for example.

In another embodiment, the present invention is an article obtained from the polyacetal compositions of the present invention. Articles of the present invention include laminate articles, shaped articles, etc. Laminates comprising the polyacetal compositions of the present invention can be incorporated into various other articles such as, for example, cars, trains, automobiles, appliances, boats, acoustic tiles, acoustic flooring, walls, ceilings, roofing materials or other articles where sound damping, low surface gloss, and/or tough polymers are desirable.

In the practice of the present invention, % gloss for a surface can be determined according to either ASTM D-523, modified as described hereinbelow or ASTM D2457. Either method can provide results that are very close to each other for a given sample. A gloss measurement can be dependent on whether optional filler, such as glass for example, is present or not. Low surface gloss for a surface comprising a natural color (NC) polyacetal composition of the present invention, wherein the composition comprises no optional filler, is a gloss measurement of less than 68%. Preferably, a surface comprising an unfilled polyacetal composition of the present invention has a gloss of less than about 65%, and more preferably less than about 60%. Polyacetal resins can optionally comprise a color additive. Polyacetal compositions that include colorants can inherently have lower gloss than similar compositions without a colorant. Low gloss for a colored polyacetal composition for the purposes of the present invention is a gloss measurement of less than about 10%. Preferably the surface gloss is less than about 8%, and more preferably less than about 5%.

In a conventional polyacetal composition that includes filler, the surface gloss is reduced relative to a non-filled conventional polyacetal composition. In a conventional polyacetal composition, the higher the percentage of filler, the lower the gloss. In a filled-polyacetal composition of the present invention, however, % gloss is reduced even more, relative to a filled conventional polyacetal composition having a similar filler content. The effect is that lowering the total amount of filler in a filled composition of the present invention can reduce the surface gloss, rather than increase the gloss as in a conventional polyacetal composition. A filled composition of the present invention comprising at least about 1 wt % filler to about 10 wt % filler has less than 50% gloss. Filled polyacetal compositions of the present invention having at least about 10% filler to about 20% filler have gloss of less than 20%. Filled polyacetal compositions of the present invention having at least about 20% filler to less than 25% filler have gloss of less than or equal to about 16% gloss. The reduction of gloss in compositions having greater than 25% filler may be less substantial as the amount of filler increases.

In a particularly preferred embodiment, polyacetal compositions of the present invention can be laminated to other polymeric materials, such as thermoplastic elastomers (TPEs). TPEs are thermoplastic materials that have rubber-like properties and are polymers that are soft to the touch. However, TPEs do not generally have good adhesion to rigid polymers. TPE laminates with the polyacetals of the present invention would eliminate this adhesion problem in many cases.

In another preferred embodiment, the polyacetal compositions of the present invention can be laminated with PVB to yield PVB laminates having substantial sound reduction properties.

In still another embodiment, laminates having at least two sheets comprising a polyacetal composition of the present invention adhered on the opposite surfaces of a PVB interlayer have improved structural strength relative to one sheet of the polyacetal having twice the thickness of the laminate polyacetal sheets. Such laminates can find use in car door panels, boat hulls, or other similar uses to impart structure and strength.

In still another embodiment the polyacetal compositions of the present invention can be used to hold onto glass fibers that are on or near the surface of articles comprising fiber-glass filled polyacetal compositions.

There are many embodiments to the present invention. Such embodiments include an article as described herein where the article has less than 20 wt % filler and a gloss of less than 20% when measured at an angle of 60 degrees; or less than 25 wt % filler and a gloss of less than 16%.

Further, the article described herein may comprise at least about 1 wt % toughener; at least about 3 wt % toughener; at least about 5 wt % toughener; at least about 7 wt % toughener; or least about 10 wt % toughener, and in each case said weight percentage of the toughener is based upon the total weight of the toughened polyacetal composition used to make the article. It is desirable for the article to comprises from about 1 wt % to about 25 wt % toughener.

The articles made from the toughened polyacetal compositions described herein may further comprises a color additive, and wherein the article has a surface gloss of less than about 5.0%.

EXAMPLES

Examples 1 to 4 and Control Example C1

In the Examples that follow, free-flowing PVB/EVA pellets[1] were melt-blended with Delrin®500P homopolymer (NC0101). Delrin® grade products are available from E.I. DuPont de Nemours and Company (DuPont). The components were pre-mixed before being compounded by melt blending in a 34 mm Leistritz twin screw extruder at a melt temperature below 230° C. The screw speed was 200 rpm and the total extruder feed rate was 15 pounds per hour.

[1]Free flowing PVB pellets as prepared according to WO 0212356, available from E.I. DuPont de Nemours and Company (DuPont).

The resulting strand was quenched in water, cut into pellets, and sparged with nitrogen until cool. Tensile bars were obtained by injection molding according to ASTM D3641 and measured for: Notched Izod (Nizod) by ASTM D256 or ISO 180; % Elongation at Yield (% EL-Y) by ASTM D638 or ISO 527; Elongation at Break (EL-B) by ASTM D638 or ISO 527; Tensile Strength (TS) by ASTM D638 or ISO 527; Flexural Modulus (F.Mod) by ASTM D790 or ISO 178; Compressive Shear Strength (CSS); and % Gloss by ASTM D523 or ASTM D2457. The results are recorded in Table 1.

Modified Compressive Shear Stress (CSS) Test for Adhesion Force of Laminated Polymer Plate Square (5"×5") plaques of 2 mm thickness were molded in an injection-molding machine according to ISO test method 294. PVB sheeting with 20 pph plasticizer (AV:N1J0126, commercially available from DuPont) was sandwiched between two plagues in a humidity controlled room (relative humidity: 23% RH). After being autoclaved at 135° C. for 20 minutes, the 5"×5" laminated polymer plate was cut to obtain six 1"×1" squares from the center plate. The six squares were dried in a vacuum oven at 60° C. overnight. Each square was sheared at 45-degree angle in an Instron in a humidity-controlled room (relative humidity: 50% RH). Force in pounds per square inch (psi) required to shear the square apart (CSS) was recorded. Average of those six squares and standard deviation were calculated for each sample and recorded in Table 1.

Gloss Measurement

% Gloss reported in Tables 1 and 2 were determined at an angle of 60 degrees using a modified ASTM D-523 method, using a Novo-Gloss Meter made by Macbeth. The measurement followed ASTM D-523 except gloss was measured at the center of a 18 mm×29 mm end tab on two ISO bars and averaged. Gloss was measured on the non-gated end of the bars in order to prevent gate smear from influencing the measurement. % Gloss reported in Tables 3 and 4 were determined at an angle of 60 degrees using ASTM D2457.

TABLE 1

|   | Ex. 1 | Ex. 2 | Ex. 3 | Ex. 4 | C1 |
|---|---|---|---|---|---|
| Delrin ® (wt %) | 90 | 90 | 90 | 90 | 100 |
| PVB (wt %) | 7 | 8 | 9 | 6.5 | 0 |
| $^a$EVA (wt %) | 3 | 2 | 1 | $3^b$ | 0 |
| Melt Flow Rate$^c$ | 12.9 | 11.9 | 12.5 | 14.1 | 15.5 |
| Nizod (KJ/M$^2$) | 5.53 | 5.24 | 4.97 | 6.79 | 7.96 |
| % EL-Y | 14.2 | 13 | 12.4 | 15.1 | 16 |
| % EL-B | 44.7 | 32.4 | 28.8 | 44.7 | 58.5 |
| TS-Kpsi | 51.1 | 52.2 | 52.8 | 52.6 | 61.9 |
| F. Mod- mPa | 2354 | 2350 | 2359 | 2366 | 2821 |
| Avg (6) CSS | 487 | 492 | 613 | 512 | 452 |
| Std Dev CSS | 84 | 126 | 51 | 38 | 106 |
| % Gloss (60° C.)$^1$ | 34 | 29 | 24 | 46 | 68 |

$^a$Elvax 40 W, commercially available from DuPont.
$^b$0.5 wt % Fusabond ® A added.
$^c$Melt-flow rate of Delrin ®.
$^1$Bars were molded at specified temperature.

Examples 5 to 8 and Comparative Example C2

The same process, procedures, and test methods in above Examples 1 to 4, & C1 were used for Examples 5-8 and Comparative Example C2 reported in Table 2 except: (a) Delrin® 500 was replaced with Delrin® 1260.

TABLE 2

|   | Ex 5 | Ex 6 | Ex 7 | Ex 8 | C2 |
|---|---|---|---|---|---|
| Delrin ® (wt %) | 90 | 90 | 90 | 90 | 100 |
| PVB (wt %) | 7 | 8 | 9 | 6.5 | 0 |
| $^a$EVA (wt %) | 3 | 2 | 1 | $3^b$ | 0 |
| Melt Flow Rate$^c$ | 30.4 | 30.4 | 30 | 29.6 | 33.1 |
| Nizod-KJ/M2 | 4.33 | 4.08 | 4.28 | 4.9 | 6.22 |
| % EL-Y | 9.5 | 10.1 | 9.9 | 10 | 8.7 |

TABLE 2-continued

|   | Ex 5 | Ex 6 | Ex 7 | Ex 8 | C2 |
|---|---|---|---|---|---|
| % EL-B | 37 | 37.8 | 36.8 | 47.8 | 53.7 |
| TS MPa | 44.7 | 44 | 46.4 | 41.9 | 50.8 |
| F. Mod- MPa | 2156 | 2146 | 2157 | 2047 | 2661 |
| Ave CSS | 384 | 369 | 555 | 405 | 325 |
| Std Dev CSS | 156 | 86 | 134 | 129 | 131 |
| % Gloss (60° C.)$^1$ | 39 | 33 | 32 | 36 | 76 |

$^a$Elvax 40 W, commercially available from DuPont.
$^b$0.5 wt % Fusabond ® A added.
$^c$Melt-flow rate of Delrin ®.
$^1$Bars were molded at specified temperature.

Examples 9 to 11 and Comparative Examples C3 & C4

Polyacetal copolymer Delrin® 300 was blended with a color additive prior to being blended with ECOCITE™ H. Through a separate feeder, Texin® 285 polyurethane was fed an extruder along with the pre-blended polyacetal. The feed was melt blended in a 30-mm Werner & Pfleiderer twin screw extruder at less than 220° C. melt temperature. The screw speed was 200 rpm and the total extruder feed rate was 20 pounds per 5 hour. In Examples C3 and C4, core shell resin was used as toughener instead of Texin® 285. Otherwise, the procedures used for Examples 1 to 4, & C1 were used for Examples 9 to 11 and Comparative Examples C3 and C4. The blends were evaluated using the test methods described hereinabove and the results reported below in Table 3.

TABLE 3

|   | Ex 9 | Ex 10 | Ex. 11 | C3 | C4 |
|---|---|---|---|---|---|
| Delrin ® | 75 | 75 | 80 | 75 | 75 |
| Ecocite ™ H (wt %) | 15 | 15 | 15 | 15 | 15 |
| Texin ® 285 | 10 | 10 | 5 | 0 | 0 |
| Core shell resin | 0 | 0 | 0 | 10 | 10 |
| Color Additive | Brown 9648 | Ebony 167A | Ebony 167A | Ebony 167A | Brown 9648 |
| Nizod (ft-lbs/in$^2$) | 4.1 | 3.79 | 3.52 | 1.89 | 1.86 |
| Nizod (kJ/m$^2$) | 19.6 | 18.1 | 16.8 | 9.0 | 8.9 |
| % EL-Y | 35.1 | 33.5 | 28.5 | 25.65 | 29.5 |
| % EL-B | 61.2 | 62 | 49 | 50.54 | 48.7 |
| TS-Mpa | 41 | 43 | 46 | 41 | 41 |
| F. Mod- MPa | 1097 | 1160 | 1301 | 1541 | 1530 |
| Avg (4) CSS | 1000 | 849 | 881 | 939 | 875 |
| Std Dev CSS | 218 | 229 | 124 | 231 | 219 |
| % Gloss (60° C.)$^1$ | 4.3 | 4.1 | 4.1 | 4.5 | 37.9 |
| % Gloss (35° C.)$^1$ |  | 2.9 | 2.9 | 4.5 |  |
| % Gloss (60° C.)$^1$ |  | 3.6 | 3.9 | 5.4 |  |
| % Gloss (90° C.)$^1$ |  | 5.1 | 4.3 | 7.0 |  |

$^1$Bars were molded at specified temperature.

Examples 12 to 14, and Comparative Examples C5, C6 and C7

The same procedure used in Example 9 was used in Examples 12 to 14, C5 and C6 except that Delrin® 460 was used in place of Delrin® 300. The results reported are below in Table 4. C7 is a commercial polyacetal without added toughener.

TABLE 4

|  | Ex 12 | Ex 13 | Ex. 14 | C5 | C6 | C7 |
|---|---|---|---|---|---|---|
| polyacetal | 75 | 75 | 80 | 70 | 70 | 100 |
| Ecocite ™ H (wt %) | 15 | 15 | 15 | 15 | 15 | 0 |
| Texin ® 285 | 10 | 10 | 5 | 0 | 0 | 0 |
| Core shell resin | 0 | 0 | 0 | 15 | 15 | 0 |
| Color Additive | Brown 9648 | Ebony 167A | Ebony 167A | Ebony 167A | Brown 9648 | Brown |
| Nizod (ft-lbs/in$^2$) | 2.3 | 1.9 | 1.3 | 2.24 | 2.33 | 0.48 |
| Nizod (kJ/m$^2$) | 11.0 | 9.1 | 8.6 | 10.7 | 11.1 | 2.29 |
| % EL-Y | 21.4 | 15 | 11.9 | 16.6 | 17.1 |  |
| % EL-B | 48.7 | 34.9 | 32.8 | 55.2 | 62.1 |  |
| TS-Mpa | 36 | 35 | 44 | 32 | 32 | 43 |
| F. Mod- MPa | 1063 | 1066 | 1509 | 1304 | 1303 | 1883 |
| Avg (4) CSS | 949 | 1131 | 704 | 974 | 927 |  |
| Std Dev CSS | 122 | 119 | 236 | 160 | 144 |  |
| % Gloss | 5 | 4.4 | 7.2 | 7.6 | 7.8 | 4.1 |
| % Gloss (35° C.)[1] |  | 4.4 | 5.5 | 5.3 |  |  |
| % Gloss (60° C.)[1] |  | 5.1 | 5.9 | 5.8 |  |  |
| % Gloss (90° C.)[1] |  | 6.5 | 7.2 | 6.8 |  |  |

[1] Bars were molded at specified temperature.

What is claimed is:

1. An article comprising a toughened polyacetal composition wherein the toughened polyacetal composition comprises:
   (a) from about 1 to about 30 weight percent of a free-flowing polyvinyl butyral (PVB) composite composition comprising from about 20 weight percent to about 95 weight percent polyvinyl butyral (PVB);
   (b) 99 to 24 weight percent polyacetal that is melt processible in a range below about 250° C. and having a number average molecular weight of at least 10,000;
   (c) at least about 1 weight percent toughening agent, wherein the toughening agent is either an ethylene-vinyl acetate copolymer, polyurethane polymer, or a combination of the two;
   (d) optionally, an amino-functional silane coupling agent in an amount of up to 1.0 weight percent selected from the group consisting of: 3-aminopropyltrialkoxysilane; gamma-aminopropyltrimethoxysilane; gamma-aminopropyltriethoxysilane, N-2-aminopropyltrialkoxysilane; and N-(2-aminoethyl)-3-aminopropylmethyldialkoxysilane;
   (e) optionally, a filler in an amount of up to about 45 weight percent wherein the article has a toughness as measured according to ASTM D256 or ISO 180 of greater than about 1 ft-lb/in$^2$ (4.78 kJ/m$^2$) and surface gloss of less than about 68% when measured from an angle of 60 degrees according to either ASTM D2457 or ASTM D523,
   wherein the article is a laminate comprising a layer of PVB sheeting as interlayer,
   wherein the laminate has a Compressive Shear Stress (CSS) greater than 300 pounds per square inch (psi); and
   wherein the article further comprises a layer of a thermoplastic elastomeric polymer.

2. The article of claim 1 wherein said article is a component of a car door panel or boat hull.

3. The article of claim 1 wherein said article is a sound damping component of a wall; a ceiling; a floor; or an appliance.

4. The article of claim 2 wherein the article is formed by an injection molding or a press molding process.

5. The article of claim 1 wherein the toughener is an ethylene-vinyl acetate copolymer.

6. The article of claim 1 wherein the coupling agent may be present as a coating or as a dispersed component in the composition.

7. The article of claim 1 wherein the free-flowing polyvinyl butyral (PVB) composite composition (a) additionally comprises from about 5 to 80 weight percent of a polymer composition comprising carboxylic acid or anhydride functionality.

* * * * *